(12) United States Patent
Paganelli

(10) Patent No.: US 11,560,722 B2
(45) Date of Patent: Jan. 24, 2023

(54) COVERING ELEMENT FOR RAISED FLOOR SYSTEMS, AND RAISED FLOOR SYSTEM

(71) Applicant: MARAZZI GROUP SRL A SOCIO UNICO, Sassuolo (IT)

(72) Inventor: Mariano Paganelli, Sassuolo (IT)

(73) Assignee: MARAZZI GROUP SRL A SOCIO UNICO, Sassuolo (IT)

( * ) Notice: Subject to any disclaimer, the term of this patent is extended or adjusted under 35 U.S.C. 154(b) by 0 days.

(21) Appl. No.: 16/960,336

(22) PCT Filed: Dec. 20, 2018

(86) PCT No.: PCT/IB2018/060464
§ 371 (c)(1),
(2) Date: Jul. 7, 2020

(87) PCT Pub. No.: WO2019/142041
PCT Pub. Date: Jul. 25, 2019

(65) Prior Publication Data
US 2021/0054634 A1    Feb. 25, 2021

(30) Foreign Application Priority Data
Jan. 16, 2018    (IT) .......... 102018000001014

(51) Int. Cl.
*E04F 15/02* (2006.01)
*E04F 15/024* (2006.01)
*B32B 7/12* (2006.01)
*B32B 9/00* (2006.01)
*B32B 9/04* (2006.01)
*E04F 15/08* (2006.01)

(52) U.S. Cl.
CPC .......... *E04F 15/02405* (2013.01); *B32B 7/12* (2013.01); *B32B 9/005* (2013.01); *B32B 9/041* (2013.01); *E04F 15/02183* (2013.01); *E04F 15/082* (2013.01); *B32B 2471/00* (2013.01); *E04F 15/02447* (2013.01)

(58) Field of Classification Search
CPC .......... E04F 15/02405; E04F 15/02183; E04F 15/082; E04F 15/02447; E04F 15/02452; E04F 15/024; B32B 9/041; B32B 2471/00
See application file for complete search history.

(56) References Cited

U.S. PATENT DOCUMENTS

2016/0040439 A1*    2/2016 Pelc .......... E04F 15/203
                                            52/126.6

FOREIGN PATENT DOCUMENTS

EP    1304425 A1    4/2003
EP    2500123 A2    9/2012
(Continued)

OTHER PUBLICATIONS

International Search Report and Written Opinion for PCT Application No. PCT/IB2018/060464 dated Feb. 15, 2019.

*Primary Examiner* — Patrick J Maestri
(74) *Attorney, Agent, or Firm* — Troutman Pepper Hamilton Sanders LLP; James E. Schutz; Chris N. Davis

(57) ABSTRACT

A covering element for raised floors, comprising a decorative component made of ceramic material, said decorative component having a top side, a bottom side opposite the top side and a thickness greater than 12 mm, wherein the covering element comprises a reinforcing component arranged underneath the bottom surface of the decorative component.

6 Claims, 2 Drawing Sheets

(56) References Cited

FOREIGN PATENT DOCUMENTS

| | | | | |
|---|---|---|---|---|
| EP | 2952650 A | | 12/2015 | |
| GB | 2309042 A | * | 7/1997 | ........ E04F 15/02411 |
| WO | 2010072704 A1 | | 7/2010 | |

* cited by examiner

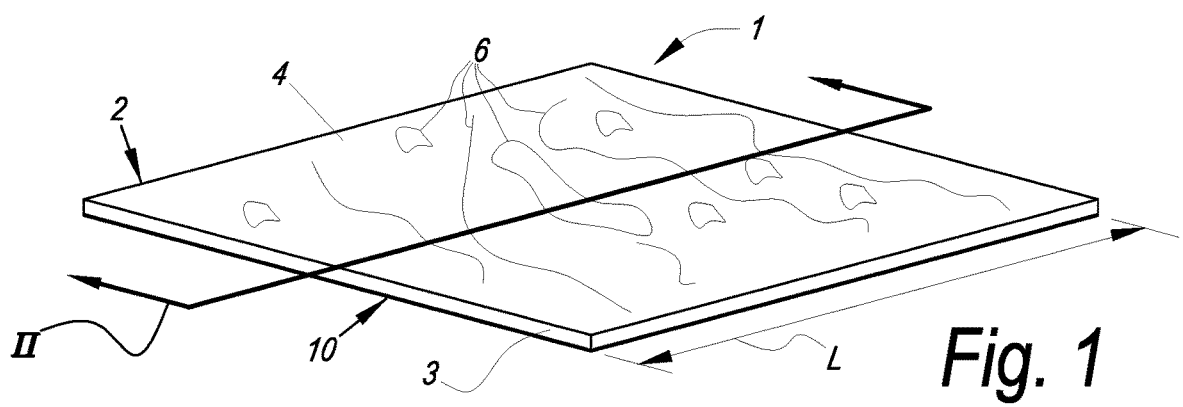
Fig. 1
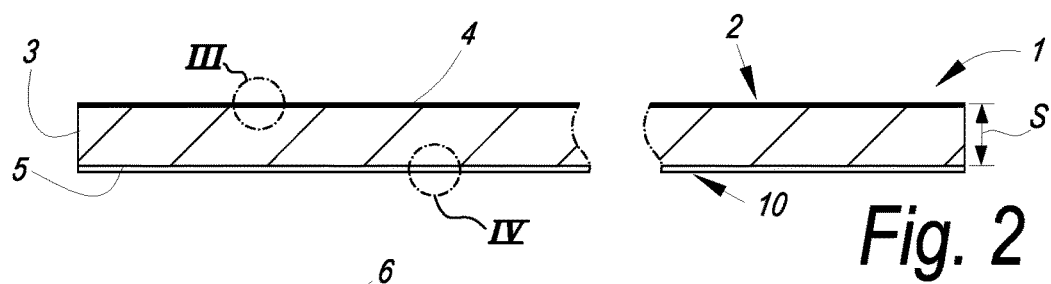
Fig. 2
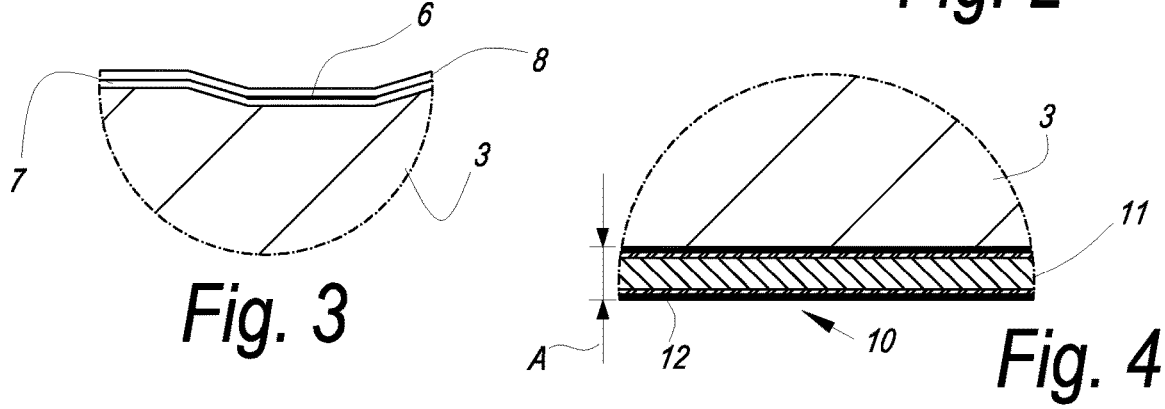
Fig. 3
Fig. 4
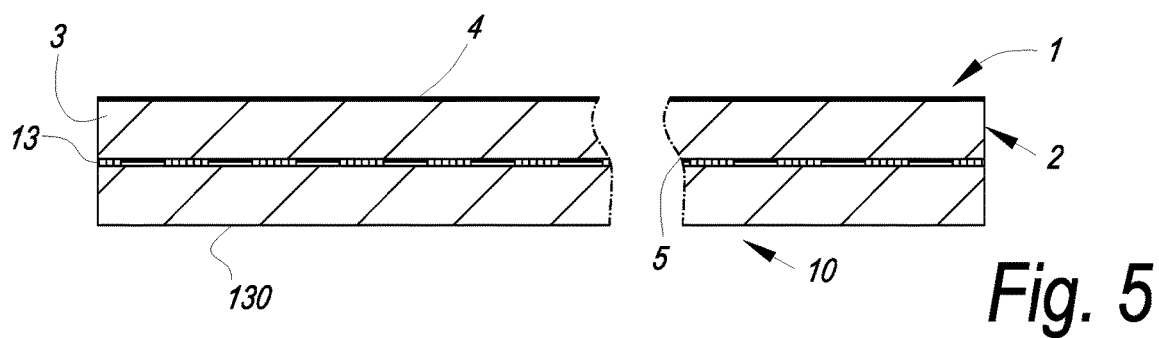
Fig. 5
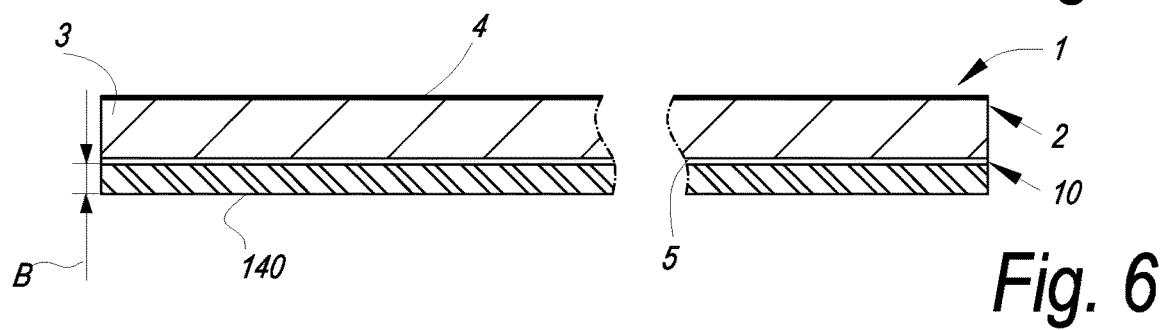
Fig. 6

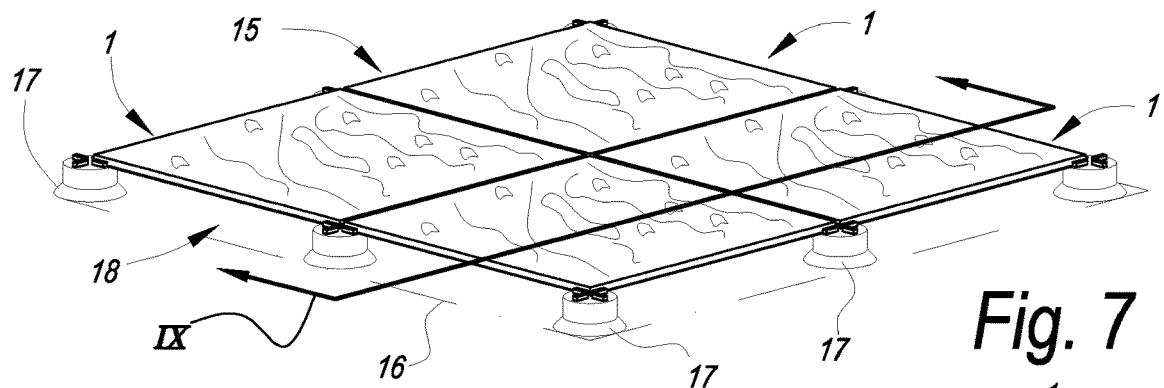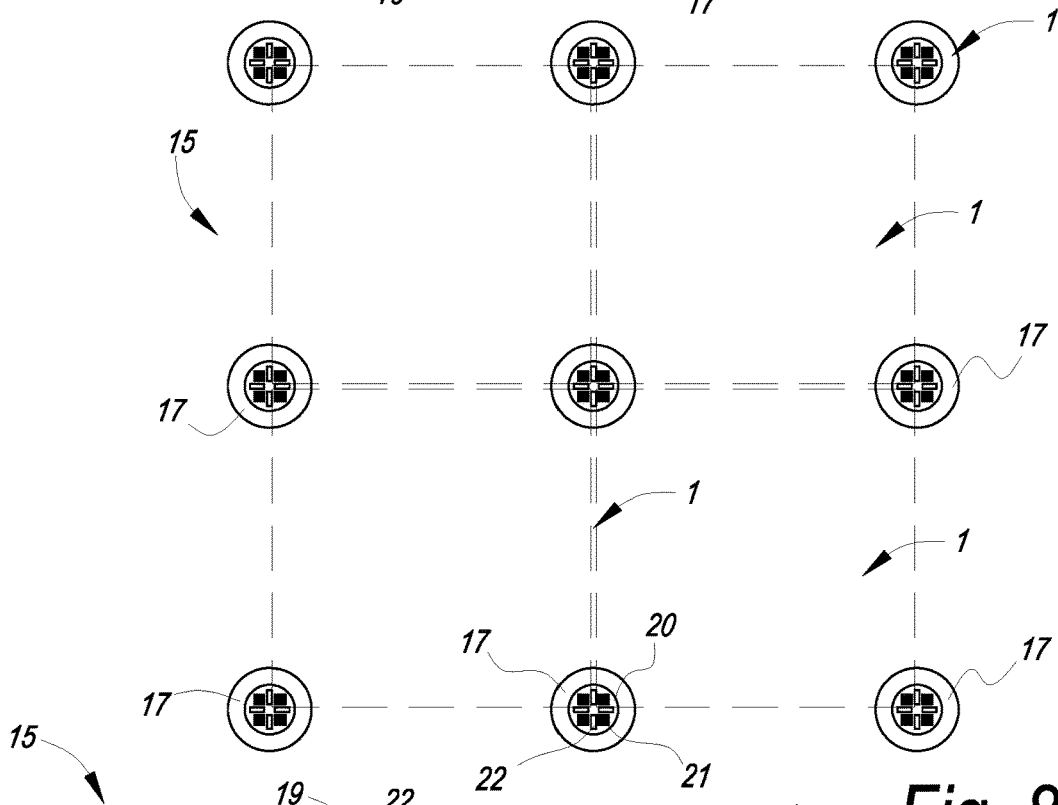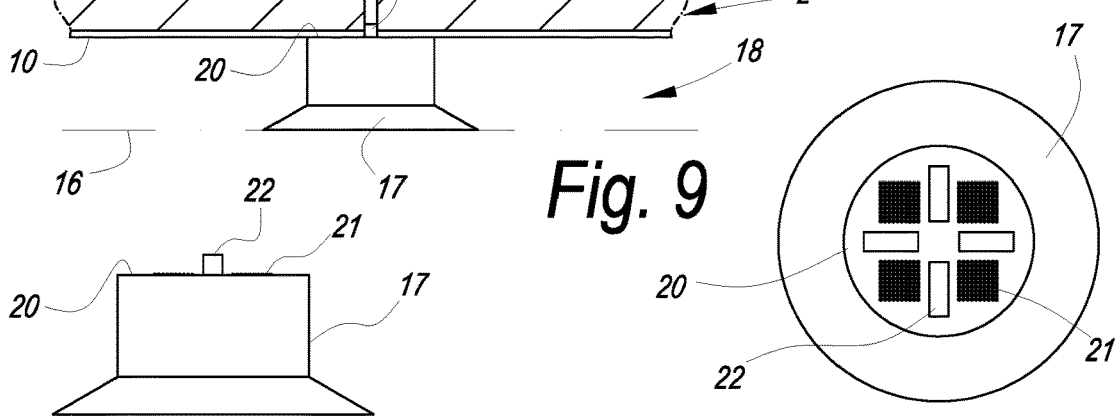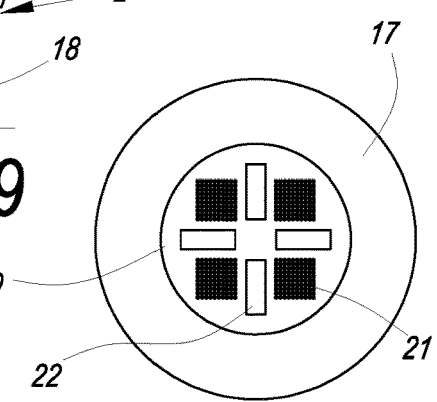
Fig. 7
Fig. 8
Fig. 9
Fig. 10
Fig. 11

COVERING ELEMENT FOR RAISED FLOOR SYSTEMS, AND RAISED FLOOR SYSTEM

CROSS-REFERENCE TO RELATED APPLICATIONS

This application is a National Stage Entry of, and claims priority to, PCT Patent Application No. PCT/IB2018/060464 filed 20 Dec. 2018, which claims priority to Italian Patent Application No. 102018000001014 filed 16 Jan. 2018, the disclosures of both of which are hereby incorporated herein in their entireties.

BACKGROUND

Technical Field

The present invention relates to a covering element for raised floor systems, and a raised floor system. In particular, the invention relates to a covering element made of ceramic material, for example a tile or a slab, designed to be used in raised floor systems.

Prior Art

As is known, raised floor systems are systems used both in internal environments, for example commercial premises or offices, and in external environments, such as terraces, gardens and swimming pools. These systems comprise a plurality of covering elements, usually made of fragile and hard material, for example ceramic, cement, glass or natural stone, arranged alongside each so as to define a walkable surface, and a plurality of supporting elements designed to support the covering elements at a given distance from the underlying surface to be covered, so as to form a cavity with the said underlying surface. Said cavity may be intended to house electric cables, pipes or other functional systems.

In the case of internal installations it is of fundamental importance for the flooring system to be totally waterproofed so as to prevent the water, used for example for cleaning the walkable surface, from flowing into the cavity and thus avoiding damage to the aforementioned functional systems and the formation of moisture and mould underneath the walkable surface. In order to waterproof the surface, frames consisting of polymer or metallic materials are used, these being glued underneath the covering element or around it. These frames or trays comprise a seal or edging of elastomer material or soft plastic which surrounds the edges of the tile and is designed to be compressed when the covering elements are arranged alongside each other so as to render the walkable surface watertight. Moreover, said frames allow the covering elements to be supported in such a way as to improve the bending strength thereof. An example of said frames is described in the document FR 2487407. However, these frames are complex to manufacture and, consequently, the systems which use them are particularly costly and heavy.

In the case of external installations, on the other hand, it is preferable to avoid waterproofing the walkable surface. In fact, following rain or other atmospheric events, puddles of water could form or accumulate on the walkable surface. Consequently, it is preferred to avoid using frames so as to allow the water to flow into the cavity and then be disposed of by means of suitable channels. In order to make up for the absence of frames and, at the same time, improve the bending strength of the covering elements, covering elements which are thicker, for example 20 mm thick, are used. However, a greater thickness of the covering element results in a greater weight and higher costs of the system and the production process. Moreover, the increased thickness is not always sufficient to ensure the desired bending strength or impact resistance.

WO 2010/072704 describes a tile of ceramic material which has, glued to a bottom surface thereof, a metal reinforcing plate which confers to the tile a compressive tensioned state starting from the bottom side of the tile. Since the compressive tensioned state is produced from the bottom surface the ceramic tile has a thickness of less than 12 mm, preferably less than 4 mm. The tile is intended to be glued to, or in any case rested on, an underlying surface so as not to be subject to excessive bending stresses and so that the underlying surface in any case helps ensure the rigidity of the system. Moreover, the tile described is intended to be used in internal environments where the reinforcing plate, being in contact with the underlying surface, is not exposed to external agents.

One object of the present invention is to overcome the aforementioned drawbacks of the prior art in the form of a simple, rational and low-cost solution. These objects are achieved by the characteristic features of the invention illustrated in the independent claim. The dependent claims define preferred and/or particularly advantageous features of the invention.

SUMMARY OF THE INVENTION

According to a first independent aspect of the invention a covering element for raised floors comprising a decorative component made of ceramic material is provided, said decorative component having a top side and a bottom side opposite to the top side. The covering element comprises a reinforcing component arranged underneath the bottom surface of the decorative component. The inventors have found that, as a result of the reinforcing component, the loading capacity of the covering element may be increased, thus ensuring a good bending strength and impact resistance such that the covering element may be walked on and loads (e.g. furniture or tools) moved in total safety.

In accordance with the preferred embodiment, the decorative component comprises a body made of ceramic material, for example porcelain stone, monoporosa, white or red paste ceramic, terracotta or other sintered ceramic powders. However, it also is possible for the decorative component to be made of any type of fragile material, such as natural stone, cement, glass or glass ceramic. "Fragile material" is understood as meaning a material which breaks without significant plastic deformation.

Preferably, the decorative component is a tile or slab. The decorative component may be made in any shape, for example a square, rectangular or hexagonal shape. According to a preferred embodiment, the decorative component is a tile or slab with a so-called large format, i.e. occupying a plan-view surface area greater than 0.3 sq. m, for example with a square shape having dimensions 60×60 cm or 90×90 cm or a rectangular shape with dimensions 40×120 cm or 60×120 cm. The format examples mentioned above are provided only by way of example and it is clear that other formats may be used. However in general it may be stated that the invention relates preferably to tiles which have a smaller side of at least 40 cm. Moreover, according to a preferred embodiment, the decorative component comprises a thickness greater than 12 mm, preferably greater than 15 mm, for example equal to 20 mm or more, in particular when intended for external applications. In fact, in this case the covering element may be used both for raised floor applications and for dry-laying directly on the ground, for example on gravel, where it is subject to significant bending stresses. However, in the case of some applications, decorative layers with a thickness smaller than 12 mm, for example 10 mm or 8 mm, may also be used.

The top side of the decorative component may have a decoration having various colours, designs or graphics. For example, according to a preferred aspect, the decoration may simulate a natural material, such as natural stone or wood, or may consist of a cement, a resin or have any other graphical form. Preferably, the decoration is at least partially formed by an imprint. The imprint is preferably realized by means of digital printing, for example inkjet printing, even though silk-screen printing, flexography, offset printing or rotogravure are also possible. Alternatively, the decoration may be unicoloured consisting of a base colour or a mixture of base colours.

The decorative component may comprise a base lining configured to cover at least partially the top side of the decorative component itself and may be designed to receive on itself the decoration, for example is configured to receive the imprint. The base lining may be white, beige, brown, grey or any other colour. In the case of a decorative component made of ceramic material the base lining comprises preferably an enamel and/or an engobe which covers the top surface of the ceramic body.

Furthermore, the decorative component may comprise a protective lining which covers at least partially the top side of said decorative component and is designed to be applied on top of the decoration. The protective lining may be transparent or translucent. The protective lining may also comprise fillers or additives which are designed to impart or enhance superficial properties of the decorative component, such as anti-wear or anti-slip properties. The protective lining may be used in combination with the base lining. In the case of a decorative component made of ceramic material the protective lining comprises preferably a glaze (transparent enamel) or granulated film which covers the top surface of the ceramic body.

According to a preferred embodiment, the bottom side of the decorative component may be substantially flat. In other words, the bottom side may be substantially free from ribs or reliefs. In particular, in the case where the decorative component is formed by a ceramic tile, the bottom side may be substantially free from the so-called "name marking". The inventors have found that this characteristic feature helps improve the adhesion of the reinforcing component.

Preferably, the decorative component is configured for external applications. In particular, the decorative component is frost-resistant and/or resistant to thermal shock. For example, in the case where the body of the decorative component is made of ceramic material it is certified as being frost-resistant in accordance with the standard ISO 10545-12 and/or is certified as resistant to thermal shock in accordance with the standard ISO 10545-9.

In accordance with the first aspect of the invention, the covering element comprises a reinforcing component arranged underneath the decorative component. The reinforcing component may be made using different possible methods, two preferred ones of which are described hereinbelow.

According to a first possible method, the reinforcing component comprises a metal plate, for example made of steel, preferably galvanized or stainless steel. Preferably, the metal plate is configured to produce a compressive state in the decorative component, starting from the bottom side thereof. In this way, since the decorative component is in a compressive state, a major improvement in the impact resistance is obtained since the compressive state prevents the spreading of cracks. In order to achieve this object the metal plate is firstly tensioned (stretched or elongated) by means of mechanical or thermal stretching and is then arranged underneath the decorative component while it is still in the elongated state. Then the stretched condition is released, by interrupting the mechanical stress or cooling the metal plate, so as to cause compression of the decorative component.

According to a preferred embodiment, the metal plate has a thermal expansion coefficient higher than the thermal expansion coefficient of the decorative layer. Owing to this solution, the metal plate may be stretched by means of heating so as to expand substantially uniformly in every direction. After the plate has been arranged underneath the decorative component it may cool so as to contract and cause compression of the decorative component.

Preferably, the metal plate has a Young's modulus greater than the Young's modulus of the decorative component, for example twice or three times the Young's modulus of the decorative component. In this way when the stretched condition of the metal plate is released, the latter is able to cause effective compression of the decorative component.

In a preferred embodiment, the metal plate has a thickness of between 0.1 mm and 1 mm, preferably between 0.2 mm and 0.5 mm, for example 0.25 mm. In particular, the inventors have surprisingly found that, with a thickness of the metal plate ranging between 0.2 mm and 0.5 mm, the impact resistance and bending strength of the covering element may be improved also in the case of decorative elements with a large thickness, for example greater than 15 mm, for example of 20 mm, which do not rest on an underlying surface, but are raised with respect to said underlying surface. In fact, the inventors have surprisingly found that a reinforcing component provided with a metal plate, preferably a steel plate, having a thickness of at least 0.2 mm, may be configured to produce a compressive state in the decorative component starting from the bottom side and extending as far as substantially the top side thereof, also in the case of decorative components with a thickness greater than 12 mm, for example of about 20 mm. In particular, the inventors have found that a metal plate, for example a steel plate, with a thickness of at least 0.2 mm may provide a ceramic decorative component of 20 mm thickness with a hard impact resistance, namely the covering element is able to withstand the impact of a steel ball weighing 1.05 kg falling from a height of 2.7 mm, generating an impact energy of about 27.8 J. In this way, the covering element is therefore able to comply fully with the requirements stipulated in the standard EN ISO 12825-01 concerning the hard impact resistance for external floors. Moreover, the inventors have found that when the covering element breaks, following subsequent stressing, the metal plate with a thickness of between 0.2 mm and 0.25 mm does not crack, retaining the fragments of the decorative component and preventing rupture of the said covering element.

Furthermore, the reinforcing component may comprise one or more protective coatings, each designed to cover at least partially, or better entirely, the metal plate so as to protect it from corrosion. In this way, the covering element is suitable for use externally and/or in damp environments. According to a preferred embodiment the protective coating may comprise an enamel, a paint or a sealing membrane. Preferably the reinforcing component comprises a metal plate of the PPGI (Pre-Painted Galvanized Iron) or PPGL (Pre-Painted GalvaLume) type. This abbreviation is understood as meaning metal (not necessarily steel) plates which are galvanized (namely covered with a zinc or aluminium layer) and painted. Basically, the metal plate is lined on one or both its surfaces with a first layer of zinc, optionally a chrome-plated layer, and one or more layers of paints or sealing membranes, for example consisting of epoxy resin polymer material, polyurethanes, polyvinyls, polyolefins or, preferably, polyesters.

According to a second possible method of making the reinforcing component, the latter comprises a fibreglass layer, for example a cloth, a mesh or a matting of fibreglass. The fibreglass may be woven or non-woven. The reinforcing component may comprise glass fibres arranged in several planes, for example with a different orientation in each plane. Instead of or in combination with glass fibre, carbon fibres, polymer fibres, for example aramid or polyamide fibres, ceramic fibres, for example consisting of boron or silicates, may be used. The inventors have found that the fibre reinforcing component is able to improve the rigidity of the covering element so as to prevent cracks from spreading and so as to improve the bending strength.

According to one embodiment the reinforcing component comprises a rigid element and a fibreglass layer so that the fibreglass layer is arranged between the decorative component and the rigid element. Preferably, the rigid element is made of fragile material, for example natural stone, cement, ceramic, glass or glass ceramic. In particular the rigid element is made substantially of the same material as the decorative component. For example, the rigid element may be defined by a ceramic tile, for example a porcelain stone tile, preferably having a quality inferior to that of the decorative component, for example it may be made from recycled material or undecorated material. The rigid element may have the same thickness as the decorative component, even though it is also possible for the rigid element to have a thickness which is smaller or greater than that of the decorative component. In any case, the covering elements which comprise a reinforcing component provided with a rigid element comprise advantageously a decorative component having a thickness less then 12 mm, for example equal to 10 mm or less.

Preferably, the reinforcing component has substantially the same shape and/or horizontal size (in plan view) as the decorative component. Furthermore, the decorative component and the reinforcing component are superimposed so that, during use, the reinforcing component is substantially hidden by the decorative component.

Preferably, the reinforcing component is fixed to the bottom side of the decorative component by means of an adhesive, for example an epoxy, polyurethane or hot-melt glue.

According to another aspect of the invention, the covering element may further comprise a soundproofing component arranged underneath the decorative component, for example underneath the reinforcing component. According to a preferred embodiment, the soundproofing component comprises a body, for example a panel, made of fibre plaster, "fibre plaster" being understood to mean a solid material which is obtained from a mixture comprising plaster powder mixed with fibres. Preferably, the fibres are made of cellulose, however, the fibres may also be of another kind, for example glass or carbon fibres or mineral, vegetable or polymer fibres. In this way it is possible to limit or dampen the noise produced by walking, in particular (but not exclusively) when the covering element is used for internal raised floors. The inventors have found that, by using fibre plaster, it is possible to provide a soundproofing component which is compact and strong, but has a small thickness, and therefore the thickness and weight of the covering element may be reduced. The soundproofing component has preferably a thickness of less than 30 mm, for example less than 20 mm, and for example equal to about 10 mm. The soundproofing component may also comprise a soundproofing element, for example a soundproofing rubber mat associated with the fibre plaster body.

Preferably, the soundproofing component is fixed to the bottom side of the decorative component (or to the reinforcing component) by means of an adhesive, for example an epoxy, polyurethane or hot-melt glue.

It is pointed out that the characteristic feature whereby the covering element comprises the soundproofing component forms an inventive idea which is independent of other characteristic features of the covering element, in particular independently of the presence of the reinforcing component and the material and thickness of the decorative component. Therefore, the present invention, in accordance with a second independent aspect, provides a covering element for raised floors which comprises a decorative component and a soundproofing component arranged underneath the decorative component, wherein the soundproofing component is made of fibre plaster. The inventors have found that, by using fibre plaster, it is possible to provide a soundproofing component which has a small thickness, and therefore the thickness and weight of the covering element may be reduced.

According to a third independent aspect of the invention a raised floor system for covering an underlying surface comprising a covering element is provided, and wherein the system further comprises at least one supporting element configured to support the covering element in a raised position with respect to the surface to be covered, forming a cavity with the said surface to be covered. It is clear that the covering element may comprise one or more of the characteristic features described in connection with the first independent aspect.

According to a preferred aspect of the invention the covering element and/or the supporting element is/are configured so that, during use, a mutual spacing or passageway is formed between adjacent covering elements, so as to allow access to said cavity.

Preferably, the covering elements are free from seals, edging or fillers. In this way, the water, for example produced by rainfall or other precipitations, may flow into the cavity which forms underneath the covering so as to prevent the formation of puddles on the covering itself. For example, the supporting elements may comprise at least one spacer configured to be arranged between the edges of two adjacent covering elements so as to define the said mutual spacing.

Preferably, the supporting element may be designed to support one or more covering elements, preferably two covering elements, for example four covering elements. Moreover, the supporting element is configured to support a perimetral portion of the covering element, for example an edge or a corner. However, it is also possible for the supporting element to be configured so as to support a central portion of a covering element, in particular in the case of particularly large formats such as 90×90 cm or 60×120 cm.

According to a preferred embodiment, the system comprises a plurality of supporting elements substantially separate and independent from each other, so as to define substantially a plurality of support feet. In other words, according to this preferred embodiment, the system is without a support frame such that the design of the covering for a specific application is particularly simple since it consists in calculating the number of supporting elements needed. For example, the supporting element may have a substantially cylindrical or frustoconical form and have a top support surface for supporting at least a portion of the bottom surface of the covering element.

It is pointed out, moreover, that the covering element and the supporting element may be configured so that they can be associated with each other in a removable manner free from fixing means. In other words, the covering element, during use, simply rests on the supporting element. According to one embodiment, the top supporting surface of the supporting element may comprise means configured to promote adhesion between the supporting element and the bottom surface of the covering element. For example, the top supporting surface of the supporting element comprises an embossed design, i.e. structure in relief or a rubberised coating or other equivalent means.

Preferably, the supporting element is made of plastic, for example polypropylene, polyethylene or polyamide. However, it is also possible for the supporting element to be made at least partially of metal or other materials.

According to a fourth independent aspect of the invention, furthermore, a method for manufacturing a covering element is provided, said method comprising one or more of the characteristic features described in connection with the first or second independent aspect. According to this fourth independent aspect, the method comprises the steps of: preparing a decorative component, for example a ceramic tile; preparing a reinforcing component; applying a glue onto the bottom side of the decorative component and/or onto a surface of the reinforcing component designed to face the bottom side of the decorative component; bringing the reinforcing component into contact with the bottom side of the decorative component; pressing together the decorative component and the reinforcing component.

It should be noted that the method may comprise the step of brushing the bottom side of the decorative component in order to clean the bottom side and remove any debris. Advantageously, the brushing steps may be performed using abrasive brushes (or other equivalent elements) in order to make said bottom side substantially flat, i.e. remove or in any case reduce any ribbing or reliefs, for example the name marking of the tile.

It should also be noted that the step which envisages preparing the reinforcing component may comprise the step of preparing the reinforcing component preformed with the desired dimensions, for example pre-cut, or may comprise the step of sizing the reinforcing component with the desired dimensions, for example the step of cutting the reinforcing component. For example, the reinforcing component may be cut to the desired size by a feed roller. Moreover, it is pointed out that the term "desired size" is understood as meaning a size substantially coinciding with the plan-view size of the decorative component, preferably slightly smaller than the plan-view size of the decorative component, so as to be hidden from view by the decorative component.

According to a preferred embodiment, after preparing the decorative component and the reinforcing component, and in any case before the gluing step, the method may comprise the step of heating the decorative component and the reinforcing component up to a predetermined gluing temperature. This solution, if applied when the reinforcing component has a thermal expansion coefficient greater than the expansion coefficient of the decorative component, allows the said reinforcing component to produce a compressive state in the decorative component after cooling. This solution is therefore particularly effective when the reinforcing component comprises a metal plate, preferably steel plate, for example a PPGI or PPGL plate. Advantageously, the gluing temperature is at least 10° C., preferably more than 20° C. greater than an initial temperature, where the initial temperature is for example the room temperature. For example, the gluing temperature may be about 40° C. It is emphasized that the gluing temperature is not necessarily the temperature at which the adhesive properties of the glue are activated, but the temperature to which the decorative component and the reinforcing component must be heated in order to be expanded and, in this expanded state, glued together. In this way, the subsequent cooling and consequent contraction of the decorative component and the reinforcing component will take place once gluing has been completed, such that the reinforcing component may produce a compressive state in the decorative component. However, it is also possible for the gluing temperature to be chosen in such a way as to activate the adhesive properties of the glue.

According to one embodiment, the decorative component and the reinforcing component may be pressed together in a calender or in a static press. In the case where the decorative component and the reinforcing component are glued together at the gluing temperature, pressing may be performed at a pressing temperature substantially coinciding with the gluing temperature, advantageously, the difference between the pressing temperature and the gluing temperature being less than 5° C., preferably less than 2° C. In this way it is ensured that complete adhesion between the components of the covering element is achieved before they contract as a result of cooling.

It is also pointed out, moreover, that the method may comprise the steps of: preparing a soundproofing component; applying a glue onto a surface of the soundproofing component designed to face the other components of the covering element; bringing the soundproofing component into contact with the bottom side of one of the other components of the covering element; pressing together the soundproofing component and the other components of the covering element. It is clear that the soundproofing component may be associated with the decorative component in addition to the reinforcing component or instead of the reinforcing component.

Further characteristic features and advantages of the invention will become clearer from a reading of the following examples provided by way of a non-limiting example, with reference to the figures shown in the attached drawings.

BRIEF DESCRIPTION OF THE DRAWINGS

FIG. 1 is an axonometric view of a covering element according to a first embodiment of the invention.

FIG. 2 is an enlarged cross-sectional view along the plane II-II of FIG. 1.

FIG. 3 is an enlarged view of the detail III according to FIG. 2.

FIG. 4 is an enlarged view of the detail IV according to FIG. 2.

FIG. 5 is an enlarged cross-sectional view along the plane II-II of FIG. 1 according to a second embodiment.

FIG. 6 is an enlarged cross-sectional view along the plane II-II of FIG. 1 according to a third embodiment.

FIG. 7 is an axonometric view of a raised floor system according to the invention.

FIG. 8 is a top plan view of the raised floor system according to FIG. 7 in which the covering elements are shown transparently in broken lines.

FIG. 9 is an enlarged detail of the cross-sectional along the plane IX-IX of FIG. 7.

FIG. 10 is a side view of a supporting element of the raised floor system.

FIG. 11 is a top plan view of the support element according to FIG. 10.

PREFERRED EMBODIMENT OF THE INVENTION

FIG. 1 shows a covering element 1 provided with a decorative component 2. The decorative component 2 comprises a body 3 made of fragile material, for example ceramic material, preferably porcelain stone, and having a top side 4 and an opposite bottom side 5. Basically, in the example shown, the decorative component 2 is substantially formed by a porcelain stone ceramic tile.

The top side 4 of the decorative component 2 comprises a decoration 6, for example a printed design, preferably formed by means of digital inkjet printing.

As shown in FIG. 3, the decorative component 2 comprises a base lining 7 configured to cover at least partially the top side 4 of the decorative component 2 and being designed to receive on it the decoration 6, for example an enamel. Furthermore, the decorative component 2 comprises a protective lining 8 which covers at least partially the top side of said decorative component 2 and is designed to be applied on top of the decoration 6, for example a glaze or a granulated film. The protective layer 8 is advantageously transparent or translucent.

In the example shown in the figure, the covering layer has a square shape and has one side with a length L, preferably greater than 40 cm, for example 60 cm (60×60 cm format). Moreover, according to the preferred embodiment shown in the figures, the decorative component 2 comprises a thickness S greater than 12 mm, preferably greater than 15 mm, for example 20 mm or more.

As shown in FIGS. 2 and 4 the covering element 1 comprises a reinforcing component 10 arranged underneath the decorative component 2. Preferably, the reinforcing component 10 has substantially the same form and/or horizontal dimension (in plan view) as the decorative component 2. Furthermore, the decorative component 2 and the reinforcing component 10 are superimposed so that, during use, the reinforcing component 10 is substantially hidden by the decorative component 2. Preferably, the reinforcing component 10 is fixed to the bottom side 5 of the decorative component 2 by means of an adhesive, for example an epoxy, polyurethane or hot-melt glue.

Preferably, the reinforcing component 10 comprises a metal plate 11, for example made of galvanized steel. Furthermore, the reinforcing component 10 comprises one or more protective coatings 12, each designed to cover at least partially, or better entirely, the metal plate so as to protect it from corrosion. In particular, according to the example shown, the reinforcing component 10 comprises a metal plate 11 of the PPGI (Pre-Painted Galvanized Iron) or PPGL (Pre-Painted GlavaLume) type. This abbreviation is understood as meaning metal (not necessarily steel) plates which are galvanized (covered with a zinc or aluminium layer) and painted. Basically, the metal plate 11 is lined on one or both its surfaces with a first layer of zinc, optionally a chrome-plated layer, and one or more protective coatings 12 of paints or sealing membranes, for example polymer material consisting of epoxy resin, polyesters, polyurethanes, polyvinyls or polyolefins.

According to the preferred embodiment shown in the figures, the decorative component 2 has a thickness A of between 0.1 mm and 1 mm, preferably between 0.2 mm and 0.5 mm, for example 0.25 mm.

Preferably, the metal plate 11 is configured to produce a compressive state in the decorative component 2 starting from the bottom side 5 thereof. In this way, since the decorative component 2 is in a compressive state, a major improvement in the impact resistance is obtained since the compressive state prevents the spreading of cracks. The inventors have surprisingly found that the reinforcing component 10 is able to achieve a significant improvement in the bending strength of the covering element. In order to achieve this objective the metal plate 11 is firstly tensioned (stretched or elongated) by means of a mechanical or thermal stretching action and is then arranged underneath the decorative component 2 while it is still in the elongated state. Then the stretched condition is released, by interrupting the mechanical stress or cooling the metal plate 11, so as to cause compression of the decorative component 2.

According to a preferred embodiment, the metal plate 11 has a thermal expansion coefficient greater than the thermal expansion coefficient of the decorative layer 2. Owing to this solution the metal plate 11 may be stretched by means of heating so as to expand in a substantially uniform manner in every direction. After the plate 11 has been arranged underneath the decorative component 2 it may cool so as to contract and cause compression of the decorative component 2.

In fact, a preferred method for implementing the invention comprises the steps of: preparing a decorative component 2, for example a ceramic tile; optionally brushing the bottom side 5 of the decorative component 2; preparing the reinforcing component 10, for example a metal plate 11, preferably a PPGI or PPGL plate; heating the decorative component 2 and the metal plate 11, for example up to a predetermined temperature T of at least 40° C. above room temperature; applying a glue on the bottom side 5 of the decorative component 2 and/or onto a surface of the reinforcing component 10 designed to be arranged facing the bottom side 5 of the decorative component 2; arranging the reinforcing component 10 underneath the decorative component 2; pressing together the decorative component 2 and the reinforcing component 10, for example by means of a static press or a calender.

FIG. 5 shows an alternative embodiment in which the reinforcing component 10 comprises a fibreglass layer 13, for example a cloth, a mesh or a matting of fibreglass.

In particular, FIG. 5 shows an embodiment in which the reinforcing component 10 may comprise a rigid element 130 and a fibreglass layer 13 so that the fibreglass layer 13 is arranged between the decorative component 2 and the rigid element 130. Preferably, the rigid element 130 is made of fragile material, for example natural stone, cement, ceramic, glass or glass ceramic, for example the same material as the decorative component. For example, the rigid element 130 consists of a ceramic tile, for example a porcelain stone tile.

FIG. 6 shows an embodiment in which the covering element 1 comprises a soundproofing component 14 arranged underneath the decorative component 2, for example underneath the reinforcing component 10. Preferably, the soundproofing component 14 is made of fibre plaster, "fibre plaster" being understood as meaning a solid material which is obtained from a mixture comprising plaster powder mixed with fibres. Preferably, the fibres are made of cellulose, however, the fibres may also be of another kind, for example glass or carbon fibres or mineral, vegetable or polymer fibres. The inventors have found that, with fibre plaster, it is possible to provide a low-thickness soundproofing component 14 and the thickness and the weight of the covering element 1 may therefore be reduced. The soundproofing component 14 has preferably a thickness B of less than 30 mm, for example less than 20 mm and for example equal to about 10 mm.

FIGS. 7 to 11 show a raised floor system 15 for covering an underlying surface 16 comprising a covering element 1, as described above, and at least one supporting element 17 configured to support the decorative element 2 in a raised position with respect to the underlying surface 16 to be covered, forming a cavity 18 with the said underlying surface 16. As shown in FIG. 11, the system 15 comprises a plurality of covering elements 1 and a plurality of supporting elements 17.

As shown from the figure, the system 15, and in particular the covering elements 1 and/or the supporting elements 17, are configured so that, during use, i.e. in an installed configuration, a passageway 19 is formed between the adjacent covering elements 1 so as to allow access to the said cavity 18. Preferably, the covering elements 1 are free from seals, edging or fillers. In this way, the floor system 15 allows the water, for example from rain or other precipitations, to flow into the cavity 18.

In the example shown in the figures, the supporting element 17 is designed to support one or more covering elements 1, for example four covering elements 1. Moreover, the supporting element 17 is configured to support a perimetral portion of the covering element 1, for example a corner.

In particular, the system 15 comprises a plurality of supporting elements 17 substantially separate and independent of each other, so as to define substantially a plurality of support feet. In other words, according to this preferred embodiment, the system 15 is without a support frame such that the design of the covering for a specific application is particularly simple since it consists essentially in calculating the number of supporting elements 17 needed.

Moreover, according to the example shown, the covering element 1 and the supporting element 17 are configured so that they can be associated with each other in a removable manner free from fixing means. In other words, the covering element 1, during use, simply rests on the supporting element 17.

In the example shown, the supporting element 17 has a substantially cylindrical or frustoconical form and has a top support surface 20 designed to support at least a portion of the bottom surface of the covering element 1. Advantageously, the top support surface 20 of the supporting element 17 comprises an embossed design 21 designed to improve adhesion between the covering element 1 and the top supporting surface 20 of the supporting element 17.

Moreover, the supporting element 17 may comprise at least one spacer 22 configured to be arranged between the edges of two adjacent covering elements 1 so as to define the passageway 19 between the covering elements 1. The spacer 22 is defined by one or more tongues which extend perpendicularly from the top supporting surface 20. Advantageously, in the example shown, the spacer 22 comprises four tongues arranged essentially in the form of a cross so as to facilitate also centring and positioning of the covering elements 1. In fact, owing to the spacer 22 thus configured, the supporting element may be positioned so as to support the corners of four covering elements 1 which may be arranged with the edges perfectly parallel to each other.

Preferably, the supporting element 17 is made of plastic, for example polypropylene, polyethylene or polyamide.

The present invention does not limit in any way the embodiments described above, but the said covering elements and systems may be made in accordance with different variants without thereby departing from the scope of the present invention.

The invention claimed is:

1. A raised floor system for covering an underlying surface, the system comprising:
    a covering element which comprises a decorative component made of ceramic material, said decorative component having a top side, a bottom side opposite to the top side and a thickness greater than 15 mm, and
    a reinforcing component comprising a metal plate with a thickness of between 0.2 mm and 0.5 mm, the reinforcement component arranged underneath the bottom surface of the decorative component and configured to produce a compressive tensioned state in the decorative component, and
    wherein the system further comprises at least one supporting element configured to support the covering element in a raised position with respect to the surface to be covered, forming a cavity with the said surface to be covered.

2. The system according to claim 1, wherein the covering element and/or the supporting element is/are configured in such a way that in an installed configuration, a passageway is formed between adjacent covering elements so as to allow access to the said cavity.

3. The system according to claim 1, wherein the covering element and the supporting element are configured so that they can be associated with each other in a removable manner free from fixing means.

4. The system according to claim 1, wherein the at least one supporting element is configured to support a perimetral portion of the covering element.

5. The system according to claim 1, wherein the reinforcing component comprises at least one protective coating for the metal plate.

6. The system according to claim 1, wherein the covering element is able to withstand an impact of a steel ball weighing 1.05 kg falling from a height of 2.7 mm, generating an impact energy of about 27.8 J.

* * * * *